This invention relates to apparatus for screening very fine difficultly screenable materials, particularly materials which cause considerable wear, and which cannot therefore be screened in rotary screening devices. It is known to classify such materials through preferably sloping cloths or perforated plates upon which linear high frequency vibrations are impressed directly or indirectly by out-of-balance or electric vibrators. It is also known to submit frames in which screens are suspended to jolts or impacts by cam shafts which act on the frame, or alternatively the movable frames may be arranged at their point of reciprocating reversal to strike a jolting rail. However, this method is frequently unsuccessful, especially when the screened material is moist and sticky and very fine screen fractions are wanted.

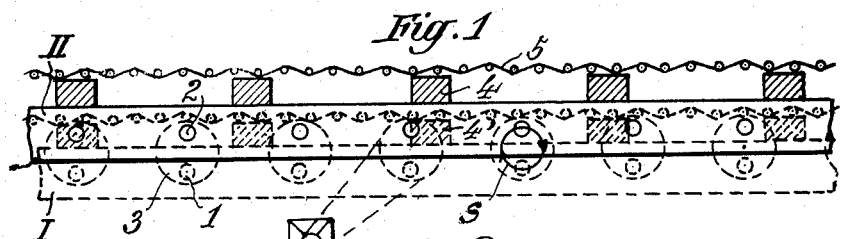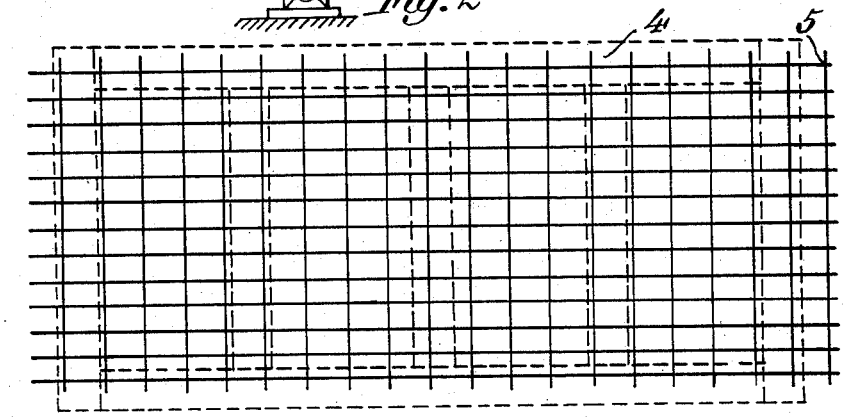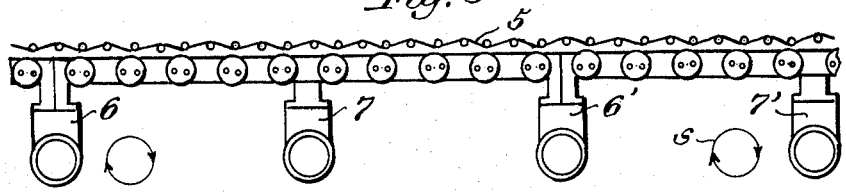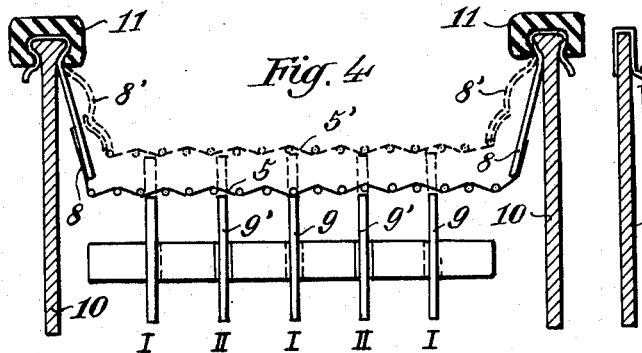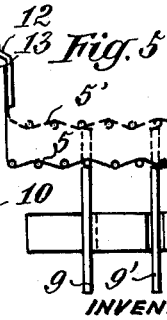
INVENTOR
ALBERT WEHNER
ATTORNEY

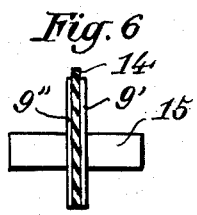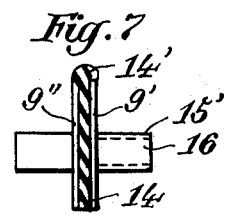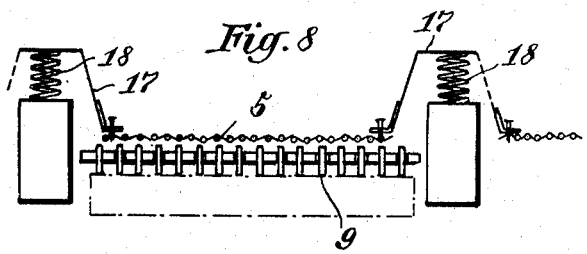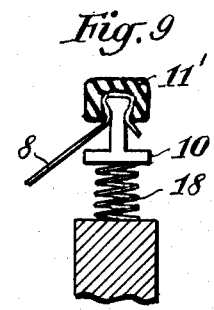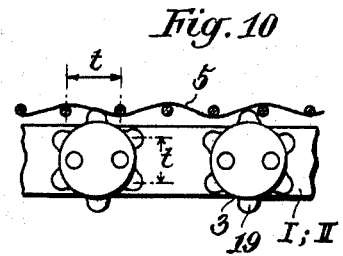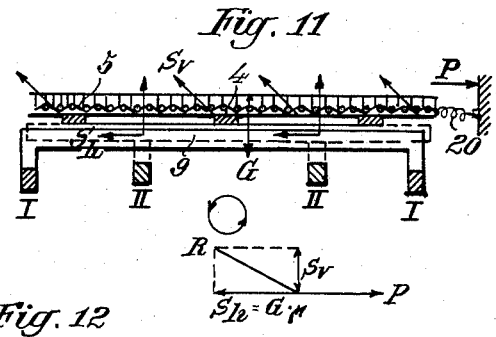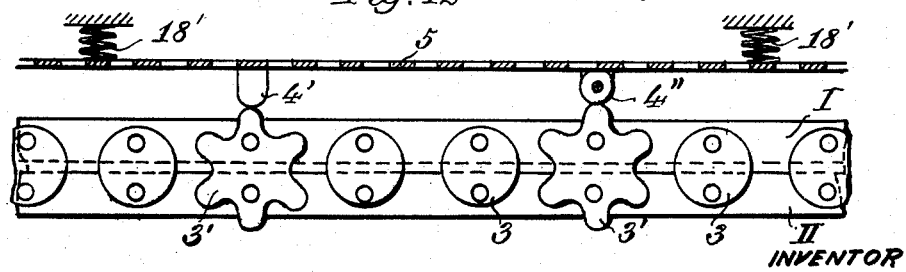
INVENTOR
ALBERT WEHNER
ATTORNEY 3,217,881
RESILIENTLY SUSPENDED SCREEN VIBRATED
BY IMPACT
Albert Wehner, Grunring 70, Herne,
Westphalia, Germany
Filed July 24, 1962, Ser. No. 212,037
Claims priority, application Germany, July 24, 1961,
W 30,400
4 Claims. (Cl. 209—330)

The present invention is based upon a novel apparatus in which the forces generated by elastic or inelastic impact are applied directly and with great intensity to the entire screening surface, and in which the frequency of jolting or jogging can be relatively high because of the smaller masses that must be accelerated. It is an important feature that the impact energy is applied to points distributed over the entire screen so that the loads are evenly distributed, permitting undesirable local overloading to be substantially reduced.

The idea underlying the invention is primarily that of using a widely gapped moving twin grating in which one or both systems are reciprocated not for direct classification but indirectly for vibrating a superimposed cloth or perforated screening plate by imparting elastic or inelastic jolts to the same, the cloth or plate resting either loosely on the bars of the grating or being resiliently applied thereto by a framing or other structures including directly contacting springs.

The envisaged apparatus is particularly advantageous if, instead of using simple double gratings with smooth straight bars, so-called UMBRA grating, i.e gyrating disc and bar gratings, are used. Possibly so-called wobble mesh gratings might also be useful. These three types of grating have the advantage of being non-choking, and for the purposes of the present invention this is an important factor when screening difficult and sticky materials, because, otherwise the material, having passed through the superimposed screening surface, might still cause blockages in a conventional jogging bar grating. In special cases it may be possible to prevent choking by spacing the bars sufficiently widely apart. However, for very fine screening it is also of great importance that the forces of adhesion and pressure which are impressed on the screen mesh by the bars should be applied at closer intervals to provide large overall contacting or impacting surfaces. This applies particularly to fine screening operations in the µ-range. In such cases the gap width of the jogging bar grating should preferably be between 2 and 3 mm. However, such fine gap widths call for the use of a special grating.

The superimposed screens may be divided into a plurality of component screens and they may be of waveshaped or stepped construction, and so forth.

In order to provide elastic jolts either the jogging grating may be provided with elastic impacting or jogging profiles or such may be provided on the jogged screen itself. Moreover, the jogged screen may be spring elastically suspended. Additional frequencies may be impressed upon the screen cloth or plate if use is made of a disc and bar grating and the discs or rollers are provided with projecting cams. Preferably the pitch of the projecting cams should correspond with the spacing of the weft wires or stays of the imposed screen to cooperate with these wires or alternatively with the cross wires or cross stays.

It is particularly useful to arrange for the grating which imparts vibrations by impact to the screen cloth or plate and the screen itself to oscillate at a frequency superimposed upon the normal frequency of vibration of conventional screening machines. Moreover, it may also be an advantage if within the normal frequency range of a screening machine the impact vibrations required for cleaning are controlled to occur intermittently. Particularly intense cleaning effects are achieved by providing the upper edges of the bars of the jogging grating with a corrugated or serrated conformation or by providing brush-like devices on the bars and possibly also on the discs or rollers. In the latter case a horizontal motion is generated because the friction between the jogging grating and the screen, especially when the latter is weighted by the screened material resting upon it, becomes sufficiently geat to impart a horizontal forwarding motion towards the dicharging end to the screen which is elastically or resiliently suspended on both sides or at the rear. As soon as these frictional forces diminish as a result of the bars of the grating changing their relative positions, the elastic forces of the suspension, especially at the rear end of the screen, can overcome the friction and return the screen to its former position. The screen therefore performs an intermittent forward and upward motion of which the components are derived from the above described forwarding motion due to the friction and the restoring motion due to the suspension in conjunction with the jogging motion imparted to the screen by the jogging profiles of the bar grating.

Since in many classifying or sizing operations, drying is desirable at the same time as screening, it is very advantageous to combine the present invention with an UMBRA grating constructed according to patent application H 32,463 VI/1a in the form of a heated grating. These UMBRA gratings function on the principle of frictional heating or eddy current heating. Alternatively, they may be so constructed that heat energy can be transferred to them by an electric current or a gas or a liquid. Furthermore, the possibilities of utilising electrostatic or electromagnetic effects may be exploited. Particularly in such combinations, and when screening to extreme fineness, the advantages of this screening method namely Cubic screening,
Large open screening surface,
No choking,
No squeezing of the screened material,
High load bearing capacity, and so forth, can be secured in an exemplary manner.

Owing to the wear of the screen by the jogging profiles it is an advantage, especially in ultrafine screening, to impose the fine screen on a coarser screen and to expose the latter to the wear of the jogging bars. By devising intermediate structures of this kind it is also possible to provide for multiple stage screening through a plurality of superimposed screens, preferably arranged with increasingly finer mesh in the downward direction. The spacing of the several screens, the spacing member being for instance elastically resilient members, may be such that pasages large enough for the relative grain size analysis remain between them.

FIG. 1 is a side elevation of apparatus for performing the method according to the invention of combining a supporting grating with a conventional screen, FIG. 2 is a corresponding plan view of FIG. 1, FIG. 3 is likewise a side elevation of apparatus according to the invention in which the screen cloth rests directly on a disc and bar grating, FIG. 4 is a section of a screening device according to the invention, comprising an UMBRA grating as a vibrator, FIG. 5 is the same as FIG. 4, FIG. 6 is the construction of an UMBRA bar specially contrived for imparting elastic jolts to the screen, FIG. 7 is the same as FIG. 6, FIG. 8 is a section of a screening apparatus in which the impact vibrated screen is resiliently displaced, FIG. 9 is a possible form of construction of the screen edges, FIG. 10 is a side elevation comprising a gyrating roller bar grating in which the rollers are provided with special projecting jogging cams, FIG. 11 shows the components of force acting on an imposed screen vibrated by a bar grating, FIG. 12 is a form of construction in which cammed discs or rollers, provided either singly or incorporated in a vibrator grating, substantially intensify the vibrations of the imposed screen.

I and II are the assembles of bars of a moving grate system, said bars being interconnected by discs 3 mounted on pivot pins 1 and 2. The screen 5, in the present case the vibrated screening surface, is provided with supporting or jogging profiles 4 which bear on the gyrating bars I and II. When the vibrator grating comprising the bars I and II is put into operation the jogging blocks which rest on the several bar systems, and hence the screen 5, are vibrated. The vertical path of the jogging blocks is determined by half the stroke, i.e. the radius, of the circle of gyration. In forms of construction in which only one of the systems of bars is movable, the number of pulses is only half that generated when both systems of bars gyrate about a common centre.

FIG. 2 is a plan view of screen cloth according to the invention.

FIG. 3 is a side elevation of a bar and disc grating upon which the screen 5 rests directly, This grating is driven by supporting oscillator elements 6, 6', 7, 7' which are associated with the several drive systems.

FIG. 4 is a section of a combination of an elastically mounted screen mesh suspended from rubber ledger strips 8 to which the screen may be secured by an adhesive, with a so-called UMBRA grating 9. The distinctive feature of such an UMBRA grating are plate shaped elements provided with inserts of a diameter adapted to the gyratory eccentricity, the size of the plate elements being so chosen that the grating is completely self-cleaning and cannot become choked. The screen is shown in two different positions. The position shown in dotted outlines is the upper position of the screen and the ledger strips 8'. The position of the screen and the ledger strips 8 shown in full lines is the bottom position. The feed end of the screen may also be elastically suspended in a manner permitting elastic displacement in and contrary to conveying direction, the arrangement resulting in an inclined upward reciprocation of the screen.

In order to permit the screen surface which is subject to a certain measure of wear, and which need not necessarily be a cloth, but may be of any desired type and even of compound construction, to be easily exchanged, the screen may be arranged to be pushed over raised lateral sections 10. These may possibly be associated with one of the driving systems. The vibrated screens may be attached thereto as shown in the drawing. Elastic capping sections 11 have proved to be most convenient.

FIG. 5 illustrates a method of suspending the screen 5 inelastically, the suspension in the illustrated example conveniently consisting of a perforated apron. The lateral sections 10 in this instance carry a capping section 12 which provides the necessary clearances 13 for the kinked edge of the screen 5.

FIG. 6 illustrates the construction of an UMBRA bar specially modified for the purposes of the present invention and provided with a special elastic jogging profile 14 held between two plates 9' and 9". Conveniently the roller extensions 15 are likewise made of elastic material which is simply passed through holes in the face plates 9' and 9".

FIG. 7 is a form of construction resembling that shown in FIG. 6 in which the profile 14' which jogs and vibrates the screen is semicircular. In this example the extensions 15' consists of the same elastic material. They form a unit together with the elastic jogging profile 14' and pass through holes in the face plates 9' and 9". Since the extensions 15' make contact only with screened material which has already passed through the screen, they may be rendered elastic by their particular shape as their only function is a sweeping action. In the illustrated embodiment extension 15' has a hollow bore 16.

In the embodiment according to FIG. 8 the screen may be elastically suspended without the employment of elastically flexible material. For instance, special suspending sections 17 may be attached to the screen 5, said sections being of inverted trough shape and supported on springs 18 which permit them to yield to the motion impressed upon them by the grate bars 9.

FIG. 9 is a different method of elastically mounting an edge of supporting rail 10 from which an elastic ledger strip 8 is suspended and held in position by an embracing flexibly elastic capping 11'.

FIG. 10 again illustrates the combination of a screen 5 with a bar and disc grating I and II in which the discs 3 are provided with cam projections 19. The latter may be pitched to correspond with the spacing of the openings in or the size of the mesh of the cloth.

In FIG. 11 the screen 5 is suspended at the feed end or along its edges by means of elastic elements 20 or arrangements of the kind shown at and 18 in other figures of the drawings, so that frictional forces which affect either directly the screen itself or its supporting or jogging blocks 4 will also produce a horizontal component of displacement $Sh$. The amplitude of this displacement is determined by the elastic tensile forces P becoming equal to the frictional forces $G\mu$, wherein G may consist of the weight screen 5 alone, or the weight of the screen plus that of the screened material, and $\mu$ is a constant whose value is determined by at least the factor of the coefficient of friction of the screened material. When the frictional forces diminish in accordance with the change in position of the screen the restoring force P generated by the elastic suspension will pull the screen horizontally back. Since a vertical component of motion $Sv$ is simultaneously generated by the preferably gyrating jogging bar assemblies I and II acting through grating 9, the screen 5 performs an inclined upward reciprocation. For the generation of a motion of this kind the entire arrangement may be inclined. The forces $Sh$ may also be influenced by the dead weight of the screened material resting on the screen.

FIG. 12, in a manner analogous to FIG. 10 illustrates a possible way of increasing the oscillatory frequency of the screen 5. In this embodiment a bar and disc grating I and II carries special cammed discs 3' between the normal gyrating discs 3. These cooperate with corresponding extensions, such as heads 4', or even with rotatably mounted abutments 4". The screen 4, 5 may be suspended elastically from springs 18. The cammed discs 3' may also have the form of cammed rollers each independently driven.

I claim:
1. A screening apparatus comprising:
   a first frame assembly including a plurality of substantially parallel spaced grate bars;
   a second frame assembly including a plurality of substantially parallel spaced apart grate bars interdigitated between and substantially coextensive with the grate bars of said first frame assembly;
   an extended surface perforated screening element including a perforated screen disposed above the grate bars of said first and second frame assemblies;
   a screen frame comprising a pair of lateral sections extending substantially coextensive with the screening element;
   means for elastically suspending and supporting said screen within said screen frame;
   contact surface means comprising spaced members, means for pivotally interconnecting said spaced members to the grate bars of said first and second frame assemblies, said contact surface means having portions extending above the uppermost surface of said grate bars; and
   means for effecting relative movement of said first and second frame assemblies to cause said contact surface means to sequentially impact and joggle said screening element.
2. A screening apparatus as defined in claim 1 wherein said contact surface means includes an elastic material.
3. A screening apparatus as defined in claim 1 wherein said means elastically suspending said screen comprises spring means connected to said screen frame for dampening the joggling of said screening element.
4. A screening apparatus as defined in claim 1 wherein said screening element is provided with upturned longitudinal edge portions which are respectively releasably secured to each one of said pair of lateral sections.

References Cited by the Examiner

UNITED STATES PATENTS

| | | | |
|---|---|---|---|
| 615,524 | 12/1898 | Brandstaedter | 209—310 |
| 694,444 | 3/1902 | Thurmond | 209—330 |
| 749,578 | 1/1904 | Porter | 209—330 |
| 950,409 | 2/1910 | Shippee | 209—347 |
| 967,358 | 8/1910 | Fogg | 209—347 |
| 1,397,337 | 11/1921 | Sturtevant | 209—328 |
| 1,707,251 | 4/1929 | Cederquist | 209—347 |
| 2,015,087 | 9/1935 | Rafton | 209—403 |

FOREIGN PATENTS

| | | |
|---|---|---|
| 698,880 | 11/1930 | France. |
| 1,179,805 | 12/1958 | France. |

HARRY B. THORNTON, *Primary Examiner.*